Oct. 18, 1966     H. K. PRICE     3,279,188
THRUST PRODUCING STEERING UNIT FOR SPACE CRAFT
Original Filed Jan. 4, 1963     4 Sheets-Sheet 1

INVENTOR

HOLLAS K. PRICE

BY *Munson H. Lane*

ATTORNEY

Oct. 18, 1966  H. K. PRICE  3,279,188
THRUST PRODUCING STEERING UNIT FOR SPACE CRAFT
Original Filed Jan. 4, 1963  4 Sheets-Sheet 2
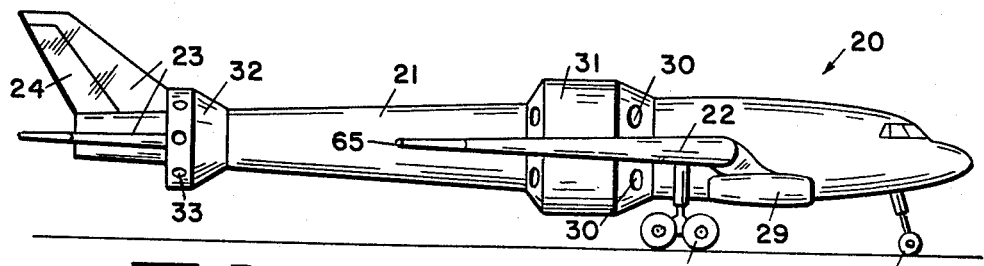
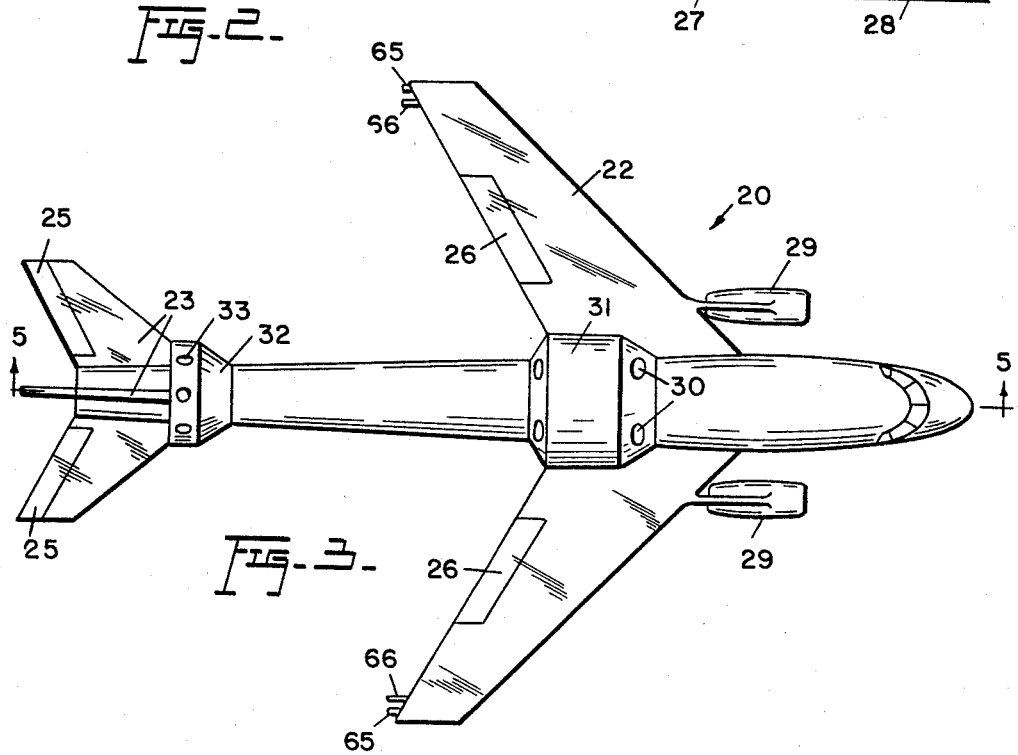
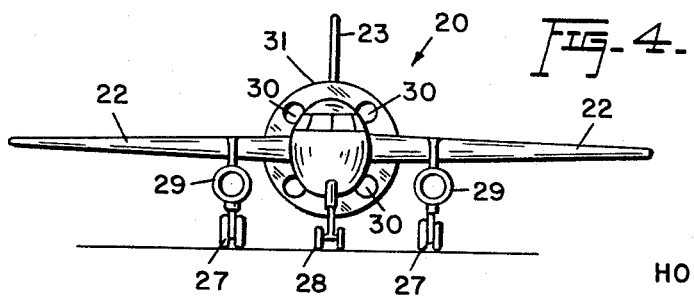
INVENTOR
HOLLAS K. PRICE
BY  Munson H. Lane
ATTORNEY Oct. 18, 1966 H. K. PRICE 3,279,188
THRUST PRODUCING STEERING UNIT FOR SPACE CRAFT
Original Filed Jan. 4, 1963 4 Sheets-Sheet 3
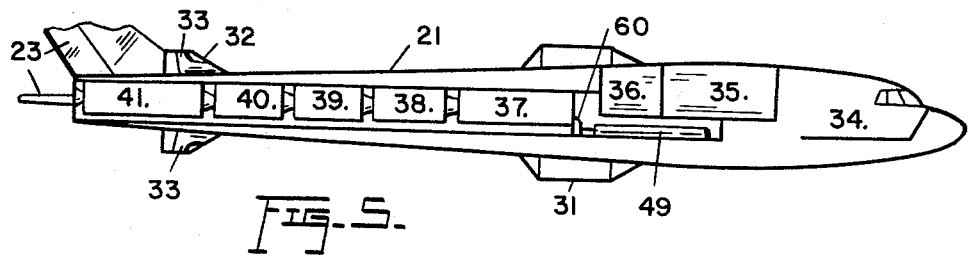
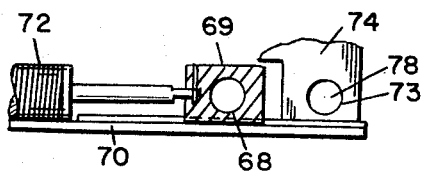
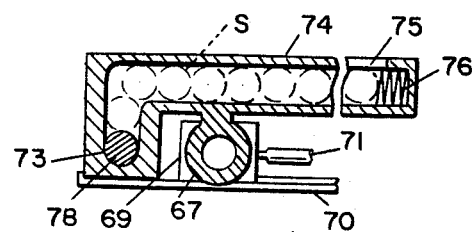
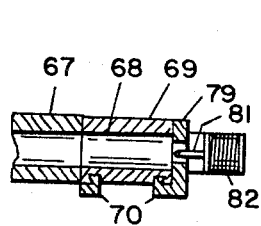
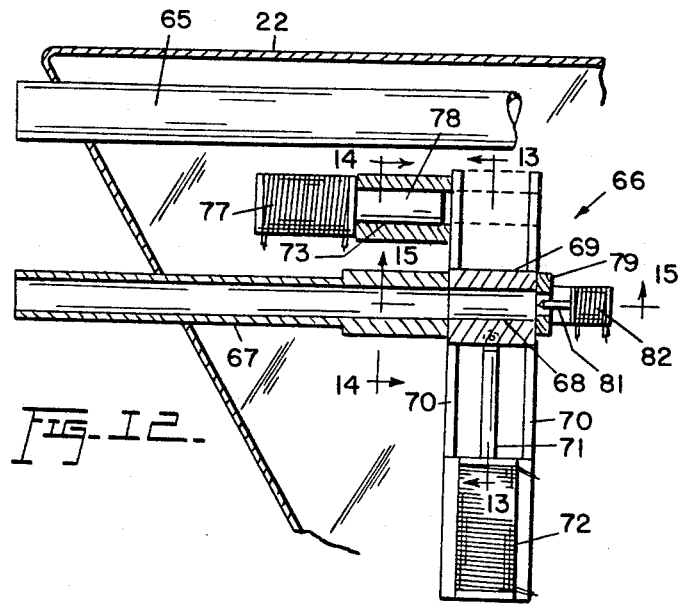
INVENTOR
HOLLAS K. PRICE
BY *Munson H. Lane*
ATTORNEY Oct. 18, 1966
H. K. PRICE
3,279,188
THRUST PRODUCING STEERING UNIT FOR SPACE CRAFT
Original Filed Jan. 4, 1963
4 Sheets-Sheet 4
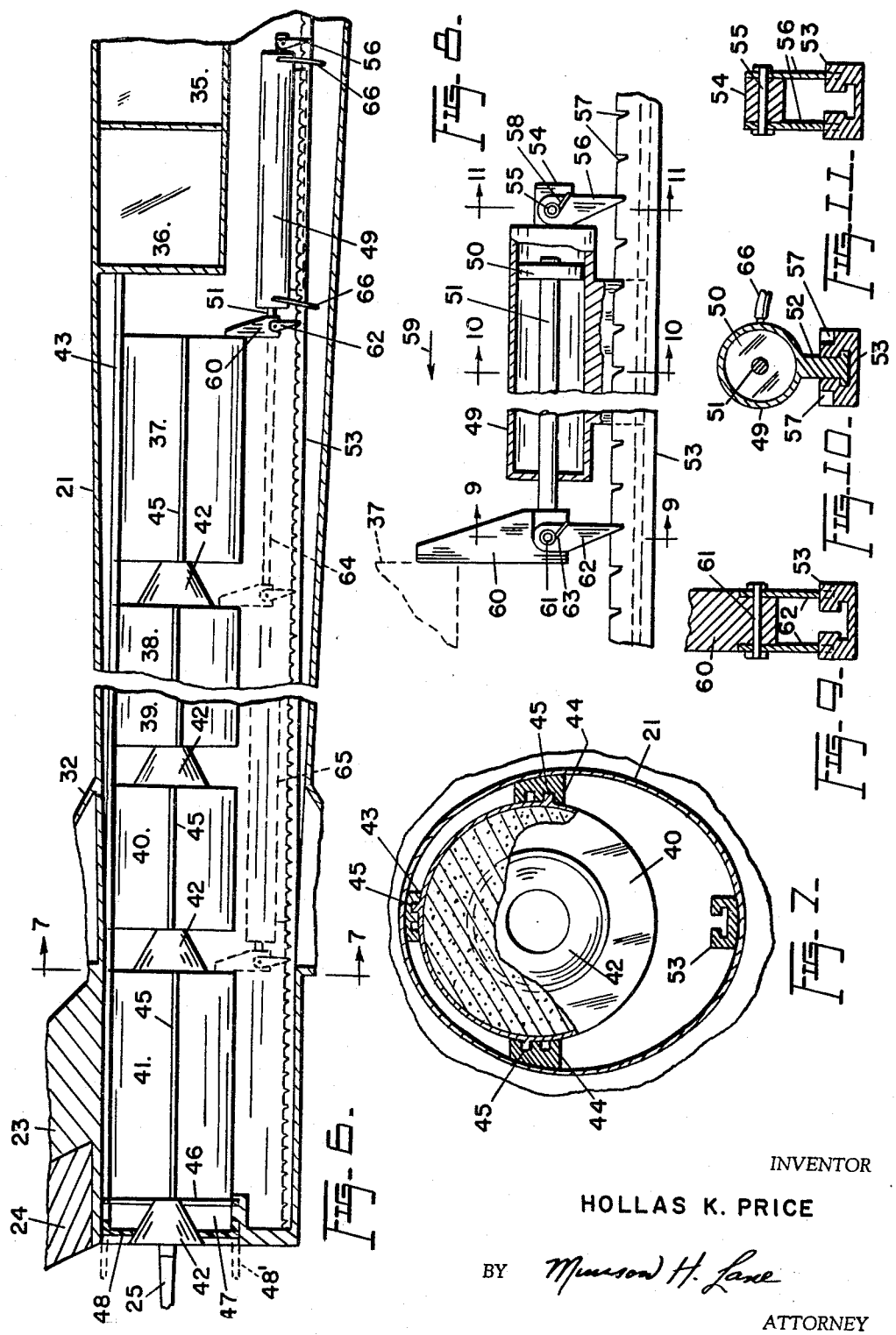
INVENTOR
HOLLAS K. PRICE
BY Munson H. Lane
ATTORNEY

United States Patent Office 3,279,188
Patented Oct. 18, 1966

3,279,188
THRUST PRODUCING STEERING UNIT FOR SPACE CRAFT
Hollas K. Price, P.O. Box 701, Oak Hill, W. Va.
Original application Jan. 4, 1963, Ser. No. 249,393, now Patent No. 3,215,373, dated Nov. 2, 1965. Divided and this application Dec. 11, 1964, Ser. No. 417,745
7 Claims. (Cl. 60—250)

This application is a division of my application Serial No. 249,393, filed January 4, 1963, now Patent No. 3,215,373. In particular, the present invention embodies certain modifications of and improvements in my earlier invention disclosed in my-copending patent application Serial No. 209,816, filed July 12, 1962, now Patent No. 3,215,372, of which this application is a continuation-in-part.

The invention relates to new and useful improvements in space craft, that is, craft adapted for orbital and/or interplanetary flights, and the principal object of the invention is to facilitate extended space flights while maintaining maneuverability and ability to re-enter and land in a controlled manner under the craft's own power.

In my aforementioned earlier application there is disclosed a space craft equipped with jet engines, under the power of which the craft may take off the ground in the manner of a conventional airplane and reach the upper layers of the atmosphere. At that point the jet engines may be shut off, and one of a plurality of rocket engines carried by the craft may be fired to boost the craft into a selected orbit or along a desired trajectory, the advantage of this arrangement being that the full power of the rocket engine is available for propulsion purposes in space, rather than being almost completely wasted in lifting the craft through dense atmospheric layers, as happens in rockets which are now being utilized.

Moreover, as also disclosed in my earlier application, additional rocket engines carried by the craft may be individually and successively fired whenever it is desired to change the orbit or trajectory of the craft in space, or to return it to the earth's atmosphere, at which point the craft's jet engines may again be energized to effect a power controlled landing. Further still, the craft in my earlier application is equipped with thrust producing means for steering purposes both in the atmosphere and in space, and with landing gear to facilitate take-off and landing in the manner of conventional aircraft.

The principal object of the present invention is to structurally and functionally improve upon the craft disclosed in my earlier application, one such improvement being directed to arranging the space craft more along the lines of contemporary jet aircraft rather than of contemporary rockets, whereby to facilitate manufacture and assembly of the craft with as much as possible of existing machinery and other equipment, while keeping at a minimum the requirement of special facilities to fabricate and assemble special components. Also in keeping with this object, the present invention is adapted to utilize power plants of a relatively small size as compared to contemporary rocket boosters, and in fact, the craft according to the present invention is capable of being constructed along the dimensions of medium size airplanes and at a reasonably comparable cost.

The space craft disclosed in my earlier application contains, as already mentioned, a plurality of individually and successively usable rocket engines, together with chain-driven means for successively placing such engines in a firing position. The present invention also improves on this structure by the provision of hydraulically actuated engine placing means which are more simple in construction, efficient in operation and otherwise better adapted for the intended purpose than the chain-driven means.

In addition, the present invention provides the craft with further means for steering the craft in space, apart form the steering means already disclosed in my earlier application.

Other objects, features and advantages of the present invention will become apparent from the following description taken in conjunction with the accompanying drawings, wherein like characters of refernce are used to designate like parts, and wherein:

FIGURE 2 is a side elevational view of the improved space craft;

FIGURE 3 is a top plan view thereof;

FIGURE 4 is a front end view thereof;

FIGURE 5 is a diagrammatic longitudinal sectional view showing the interior arrangement of the craft;

FIGURE 6 is an enlarged, fragmentary longitudinal sectional view of a portion of the fuselage;

FIGURE 7 is an enlarged cross-sectional view, taken substantially in the plane of the line 7—7 in FIGURE 6;

FIGURE 8 is an enlarged, fragmentary view, partly in section and partly in elevation, of the rocket engine placing means;

FIGURE 9 is a fragmentary sectional view, taken substantially in the plane of the line 9—9 of FIGURE 8;

FIGURE 10 is a fragmentary sectional view, taken substantially in the plane of the line 10—10 in FIGURE 8;

FIGURE 11 is a fragmentary sectional view, taken substantially in the plane of the line 11—11 in FIGURE 8;

FIGURE 12 is an enlarged, fragmentary sectional view of one of the wing tips with steering means therein;

FIGURE 13 is a fragmentary sectional view, taken substantially in the plane of the line 13—13 in FIGURE 12;

FIGURE 14 is a fragmentary sectional view, taken substantially in the plane of the line 14—14 in FIGURE 12; and FIGURE 15 is a fragmentary sectional view, taken substantially in the plane of the line 15—15 in FIGURE 12.

Figure 1:
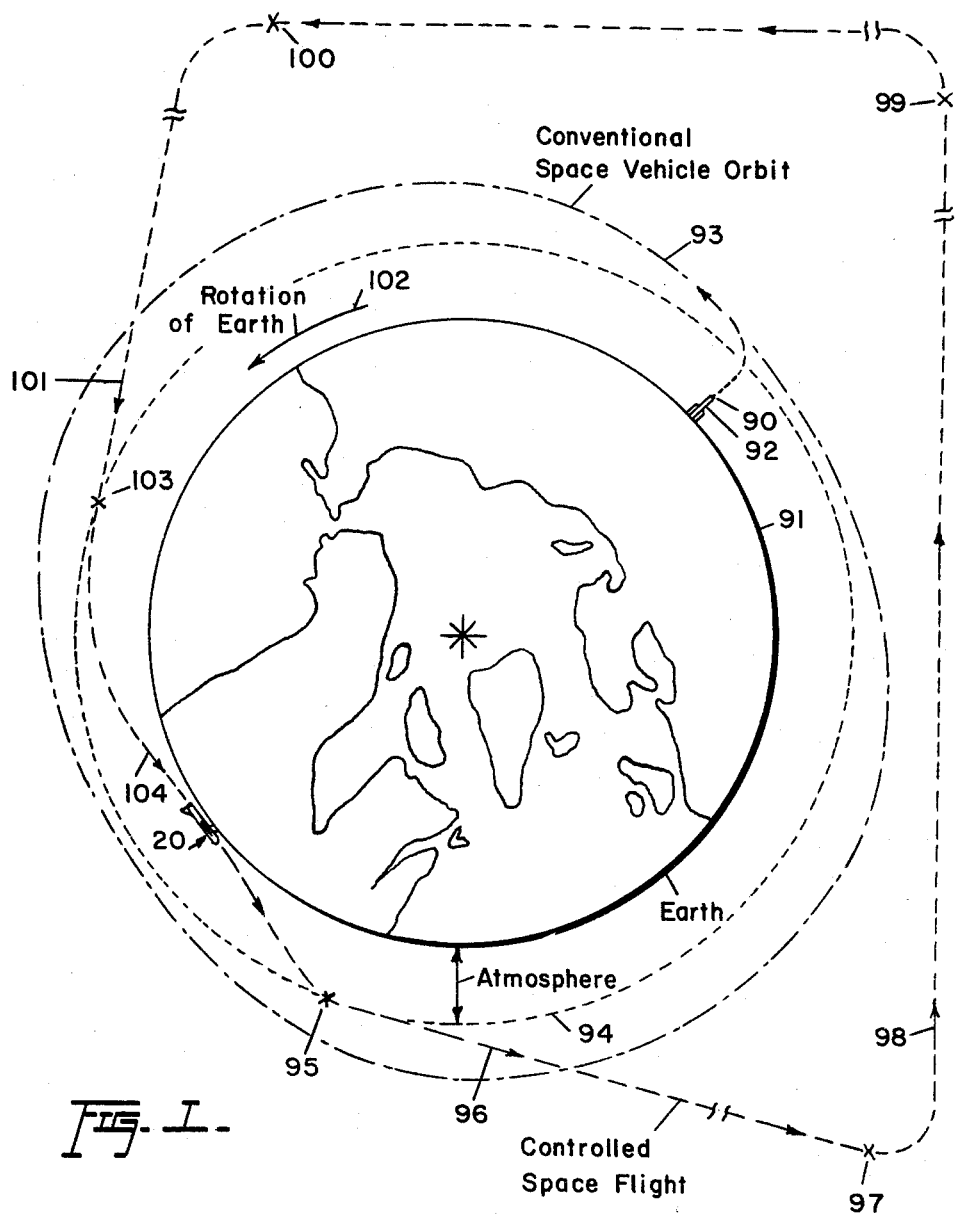
FIGURE 1 is a diagrammatic illustration, viewed from above the North Pole of the earth, and showing a controlled space flight of the craft of the invention in comparison to a conventional space vehicle orbit.

Referring now to the accompanying drawings in detail, more particularly to FIGURES 2, 3 and 4, the space craft in accordance with the present invention is designated generally by the reference numeral 20. As will be apparent, the space craft 20 has a general configuration of a medium-sized, contemporary jet airplane and includes a fuselage 21 equipped with a pair of back-swept wings 22 and tail empennage 23 including a rudder 24 and elevators 25. The wings 22 are provided with ailerons 26 and with retractable main units 27 of the landing gear which also includes a retractable nose wheel unit 28, as will be clearly apparent.

Each of the wings 22 also carries a conventional jet engine 29 and four additional such engines, indicated at 30, are disposed in an annular engine nacelle 31 which encircles the fuselage 21 amidships, preferably between the wings 22. Further aft, the fuselage is encircled by an annular casing 32 which is disposed immediately forward of the tail empennage 23 and contains a set of circumferentially spaced, laterally discharging steering jets 33. Generally speaking, the arrangement of the propulsion jets 29, 30 and steering jets 33 is similar to that disclosed in my aforementioned earlier application, except that in the present invention the jets 29 are located at the leading edge of the wings, the jets 30 in the nacelle 31 are reduced in number, and both the jets 29, 30 are smaller in size, compatible with the medium size of the craft as a whole.

With reference now to FIGURE 5, it will be noted that the forward portion of the fuselage 21 contains a cockpit or flight deck 34, aft of which is a tank 35 containing fuel for the jets 29, 30 and 33. Aft of the tank 35 is a tank 36 for compressed gas which may be used to operate the steering jets 33 in outer space, in place of the jet fuel in the tank 35 which is used primarily for the propulsion jet engines 29, 30 and for steering by the jets 33 in lower atmosphere.

Extending from behind the tank 36 to the tail end of the fuselage 21 is a row of rocket engines 37, 38, 39 40, 41, each having an outlet nozzle 42. The engines 37–41 are slidable along a set of circumferentially spaced guides 43, 44 which extend longitudinally in the fuselage 21, each guide being provided with a pair of parallel grooves to slidably receive longitudinal ribs 45 on the outer lateral surface of the rocket engines, this arrangement being substantially the same as that disclosed in my aforementioned earlier application, as in the releasable locking ring 46 in the tail end portion of the guides 43, 44, which serves to retain the rearmost rocket engine in the firing position, but subsequently releases it for ejection from the fuselage after it has been fired, while providing stop means for the next rocket engine in the row in the firing position. As will be observed in FIGURE 6, the tail end of the fuselage is provided with an opening 47 through which fired and expended rocket engines are ejected, but a resiliently flexible collar 48 is provided in the opening 47 and embraces the outlet nozzle 42 of the rearmost rocket engine, whereby to afford a closure for the opening 47. Of course, as the rocket engine is ejected, the collar 48 is spread out as indicated by the dotted lines 48', to facilitate passage of the engine therethrough.

The rocket engines 37–41 are disposed in a row, with the outlet nozzle 42 of one engine abutting the adjacent end of the next engine. Novel means are provided for advancing the several engines individually and successively to the firing position at the tail end of the row. These means are hydraulically actuated and comprise a hydraulic cylinder 49 having a reciprocable piston 50 therein, the piston being carried by a piston rod 51 which projects through the rear end of the cylinder. The cylinder 49 is equipped with a depending web 52 which is of an inverted T-shaped cross section and is slidable in a guide or track 53 which extends longitudinally in the bottom portion of the fuselage along the entire length of the row of rocket engines 37–41. The cylinder 49 is double-acting and is provided at its ends thereof with flexible hoses 66 for hydraulic fluid under pressure, controlled by a suitable valve (not shown). The forward end of the cylinder 49 has a lug 54 to which is pivoted by a pin 55 a pawl unit 56. The latter engages a rack 57 provided in the guide 53, being urged into engagement therewith by a spring 58. The arrangement is such that the pawl unit 56 permits the cylinder 49 to slide rearwardly, that is, in the direction of the arrow 59 in FIGURE 8, but prevents sliding of the cylinder in the forward direction. The outer end of the piston rod 51 carries a rigid, upstanding pusher member 60 which abuts the forward end of the rocket engine 37. The member 60 has pivoted thereto by a pin 61 a pawl unit 62 which is urged by a spring 63 into engagement with the rack 57 in the guide 53 so that the member 60 with the associated piston rod 51 may move rearwardly in the direction of the arrow 59, but forward movement of the member and piston rod is prevented.

Operation of the hydraulic position mechanism will be apparent from FIGURE 6. After the rearmost rocket engine 41 has been fired, it is ejected from the fuselage through the opening 47 by admitting fluid under pressure into the front end of the cylinder 49. This causes the rod 51 and the member 60 to move rearwardly to the position indicated by the dotted lines 64, in which position ejection of the engine 41 has been completed and the next engine 40 comes into abutment with the locking ring 46. During rearward movement of the piston rod 51, forward movement of the cylinder 49 is prevented by the pawl unit 56. The hydraulic pressure is then diverted to the rear end of the cylinder 49, but since the piston rod 51 is prevented from sliding forwardly by the pawl unit 62, the cylinder 49 itself is slid rearwardly by the hydraulic pressure, until it is in a position adjacent the pusher member 60. The procedure may then be repeated to eject the engine 40 as well as the next in line engines 39, 38, 37, the ultimate position of the cylinder 49 as indicated at 65 being in readiness for ejection of the last engine 37. When the fuselage is to be re-loaded with new engines, the pawl units 56, 62 are manually disengaged from the rack 57 to facilitate sliding of the hydraulic cylinder to its initial position at the forward end of the guide 53. It will be observed that sufficient space exists in the bottom portion of the fuselage for passage of personnel therethrough in inspection or servicing procedures.

In lower atmospheric layers, steering of the craft is effected by the rudder 24 and by the steering jets 33 in the casing 32. In outer space, steering is effected by a pair of rockets guns 65 which are disposed in tips of the wings 22, as disclosed in my aforementioned earlier application. However, the present craft is also equipped with additional steering means for use in outer space, these means comprising a pair of gun-type steering units 66 which are mounted in the wing tips adjacent the guns 65.

As detailed in FIGURES 12–15, each of the steering units 66 consists of a gun barrel 67 which projects rearwardly from the wing tip, while its forward end is registrable with a shell receiving picket 68 of a reciprocable breech block 69. The latter is slidable transversely of the barrel 67 along a pair of guides 70 by a reciprocable armature 71 of a solenoid 72 which is fixedly secured to the guides 70. At one end of its reciprocating travel, the breech block 69 has its shell pocket 68 in alignment with the barrel 67, while at the other end of its travel the pocket 68 is aligned with a bay 73 of a shell magazine 74 which contains a supply of shells, indicated at S. The shells S are loaded into the magazine 74 through an inlet opening 75 and are pressed or advanced into the bay 73 by a suitable spring 76.

A solenoid 77 is provided at one side of the magazine bay 73 and has a reciprocable armature 78 which, when projected, causes a shell in the bay 73 to slide into the pocket 68 of the breech block 69 when the latter is in a position where the bay 73 and the pocket 68 are in register. The solenoid 72 is then energized to retract the armature 71, thus sliding the block 69 to a position where the pocket 68 and the shell loaded therein are in alignment with the barrel 67. In this position the shell in the pocket 68 is backed by an abutment plate 79 and the latter is apertured to provide a passage for a reciprocable firing pin 80, constituted by the pointed end of an armature 81 of an electromagnet or solenoid 82. The backing plate 79 and the solenoid 82 are carried by one of the guides 70, as shown.

The shell S is similar to a conventional shot gun shell in that it contains a percussion cap and a quantity of explosive, although it does not contain any shot, as such. When the explosive in the shell is ignited by contact of the firing pin 81 with the percussion cap of the shell, the resultant explosion produces a thrust which is transmitted through the shell backing plate 79 and guides 70 to the wing 22 and to the craft as a whole for steering purposes.

After the shell is exploded the solenoid 72 is energized to slide the breech block 69 to the magazine bay 73, and upon actuation of the solenoid 77 to place a fresh shell from the magazine bay in the pocket 68 of the breech block, the previously exploded shell is automatically ejected from the pocket of the breech block by the incoming fresh shell. The exploded shell so ejected drops into a suitable receptacle (not shown) provided in the wing, so that it remains in the craft rather than being jettisoned into space. The shell firing procedure may then be repeated as often as necessary or desirable for steering purposes.

Reference is now drawn to FIGURE 1 which diagrammatically illustrates the controlled spaced flight of the present craft in relation to a conventional space vehicle orbit. The conventional space vehicle 90 is lifted from the earth 91 by a rocket booster 92 which must attain the necessary escape velocity of some 18,000 m.p.h. in order to place the space vehicle into an elliptical orbit 93 around the earth. Such an orbit is a continuous, endless path which the space vehicle maintains without any power facilities for a change of direction, inasmuch as all available power has been expended by the rocket booster in lifting the space craft through the atmosphere 94 and placing it in the desired orbit. Whatever may be accomplished by changing the attitude of the craft in orbit relative to the earth is totally useless in changing the orbit itself, and when the desired number of orbital flights is attained the speed of the craft is slowed down so that the craft returns under gravity to the earth, yet at a speed which is high enough to cause generation of considerable heat in and around the craft upon re-entry into atmospheric layers. It therefore follows from the foregoing that orbital flights of conventional space craft are wholly incapable of space exploration wherein directionally variable flight is desirable.

On the other hand, the space craft 20 of the present invention completely disposes of the conventional rocket booster and ignores the obvious limitations of orbital flights of conventional space vehicles. As such, the craft 20 may take off from the earth in the manner of a conventional airplane, under the power of the jet engines 29, 30 which are capable of bringing the craft to the outer layers of the earth's atmosphere, for example, to the point 95 indicated in FIGURE 1. At that point the craft may be leveled off or otherwise oriented in any desired direction, for example in the direction of the arrow 96, and the rocket engine 41 may be fired to provide the necessary thrust for propelling the craft in that direction, without regard to gravitational, centrifugal or other orbital forces, it being noted in this connection that up to the point 95, the craft has been propelled by jet power without a waste of rocket power in lifting the craft through dense atmospheric layers.

When the craft has traveled in the direction 96 for a desired extent, for example, to the point 97, the steering means 65, 66 may be energized to orient the craft in another desired direction, for example in the direction of the arrow 98, and the rocket engine 40 may then be fired to propel the craft in that direction. Similarly, the procedure may be repeated at the points 99 and 100, whereupon the last rocket engine 37 is used to propel the craft in the direction of the arrow 101 for re-entry into the earth's atmosphere.

Because of the directionally controlled space flight which the invention affords, the craft 20 may take off from the earth in any desired direction, that is, in any desired compass bearing. However, for re-entry purposes it is preferred that the craft enters the atmosphere from west to east, that is, so as to take advantage of the movement of the atmosphere with the earth, which at equatorial latitude and altitude of 150 miles amounts to some 1,100 m.p.h. The directionally controlled craft of the invention may enter the rotating atmosphere in the direction of its rotation and at approximately the same or a slightly higher speed, as for example at the point 103, and gradually descend to the earth as at 104 so that very little, if any, air friction and heating is encountered. During the descent through the atmosphere, the jet engines 29, 30, of course are energized to make a powered landing along the glide path 104 in a properly controlled manner, much the same as in landing of conventional aircraft.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the appended claims.

I claim:

1. In a thrust producing steering unit for space craft, the combination of a gun-type barrel, a breech block having a shell receiving pocket, said breech block being movable between a first position wherein said pocket is in register with said barrel and a second position wherein said pocket is offset from the barrel, a shell magazine having a bay in register with said pocket when the breech block is in its second position, power means for transferring a shell from said magazine bay into the breech block pocket when the bay and the pocket are in register, power means for moving said breech block between its two positions, means for firing a shell in said pocket when the breech block is in its first position, said power means for transferring a shell from said magazine bay into said pocket comprising a solenoid having an armature reciprocable in and out of said bay.

2. The device as defined in claim 1 together with resilient means provided in said magazine for biasing shells therein into said bay.

3. The device as defined in claim 1 wherein said power means for transferring a shell from said magazine bay into said pocket are simultaneously operable to eject a fired shell from said pocket.

4. The device as defined in claim 1 wherein said means for firing a shell comprise a solenoid having a reciprocable armature constituting a firing pin, said pin being engageable with a percussion cap of a shell in said pocket when the latter is in register with said barrel.

5. The device as defined in claim 1 wherein said power means for moving said breech block comprise a solenoid having a reciprocable armature connected to said block.

6. A thrust producing steering unit for space craft, said unit comprising a gun-type barrel, a reciprocable breech block having a shell receiving pocket registrable with said barrel at one end of the reciprocating travel of said block, a shell magazine having a bay in register with said pocket at the opposite end of travel of said block, resilient means biasing shells in said magazine into said bay, power means for reciprocating said block, power means for transferring a shell from said magazine bay into said pocket of the breech block and simultaneously ejecting a fired shell therefrom, means for firing a shell in said pocket when the breech block is in register with said barrel, said means for transferring a shell from said magazine bay into said pocket comprising a solenoid having an armature reciprocable in and out of said magazine bay.

7. The device as defined in claim 6 wherein said last mentioned means comprise a solenoid having a reciprocable armature constituting a firing pin, said pin being engageable with a percussion cap of a shell in said pocket when said breech block is in register with said barrel.

References Cited by the Examiner

UNITED STATES PATENTS

| 379,794 | 3/1888 | Leineweber | 42—39.5 |
|---|---|---|---|
| 1,103,503 | 7/1914 | Goddard. | |
| 1,194,496 | 8/1916 | Goddard. | |
| 2,172,163 | 9/1939 | Glowka | 60—35.6 |
| 2,403,730 | 7/1946 | Mac Neille | 60—26.11 X |
| 2,865,126 | 12/1958 | Dardick | 42—39.5 X |
| 3,075,433 | 1/1963 | Stockholm | 42—84 X |

MARK NEWMAN, *Primary Examiner.*

CARLTON R. CROYLE, *Examiner.*